(12) United States Patent
Hirata et al.

(10) Patent No.: US 10,473,983 B2
(45) Date of Patent: Nov. 12, 2019

(54) DISPLAY PANEL

(71) Applicant: Panasonic Liquid Crystal Display Co., Ltd., Himeji-shi, Hyogo (JP)

(72) Inventors: Masafumi Hirata, Hyogo (JP); Nagatoshi Kurahashi, Hyogo (JP)

(73) Assignee: Panasonic Liquid Crystal Display Co., Ltd., Hyogo (JP)

( * ) Notice: Subject to any disclaimer, the term of this patent is extended or adjusted under 35 U.S.C. 154(b) by 0 days.

(21) Appl. No.: 15/818,021

(22) Filed: Nov. 20, 2017

(65) Prior Publication Data

US 2018/0074353 A1 Mar. 15, 2018

Related U.S. Application Data

(63) Continuation of application No. PCT/JP2016/001071, filed on Feb. 26, 2016.

(30) Foreign Application Priority Data

May 20, 2015 (JP) .................. 2015-103131

(51) Int. Cl.
*G02F 1/1339* (2006.01)
*G02F 1/1335* (2006.01)
*G02F 1/1362* (2006.01)

(52) U.S. Cl.
CPC ...... *G02F 1/1339* (2013.01); *G02F 1/133512* (2013.01); *G02F 1/136286* (2013.01); *G02F 2201/123* (2013.01); *G02F 2201/50* (2013.01); *G02F 2201/56* (2013.01); *G02F 2202/023* (2013.01)

(58) Field of Classification Search
CPC ..................................................... G02F 1/1339
See application file for complete search history.

(56) References Cited

U.S. PATENT DOCUMENTS

2009/0115933 A1* 5/2009 Mimura ............ G02F 1/133512
349/59
2012/0112988 A1* 5/2012 Nakanishi ......... G02F 1/134309
345/76

(Continued)

FOREIGN PATENT DOCUMENTS

JP 2008-107488 5/2008
JP 2010-072368 4/2010

(Continued)

*Primary Examiner* — Edmond C Lau
(74) *Attorney, Agent, or Firm* — Hamre, Schumann, Mueller & Larson, P.C.

(57) ABSTRACT

A display panel has a variant external shape. The display panel includes a first substrate, a second substrate disposed opposite to the first substrate, liquid crystal sealed between the first substrate and the second substrate, a seal made of a photosetting material, the seal being provided outside a display region, the seal being used to seal the liquid crystal by bonding the first substrate and the second substrate together, and a metallic pattern provided in the first substrate or the second substrate, including a plurality of slits through which light with which the seal is irradiated passes. The plurality of slits are formed along the external shape of the display panel in at least a portion corresponding to a variant portion of the display panel.

9 Claims, 9 Drawing Sheets

(56) References Cited

U.S. PATENT DOCUMENTS

| | | | |
|---|---|---|---|
| 2012/0257132 A1* | 10/2012 | Kitajima | G02F 1/133512 |
| | | | 349/42 |
| 2013/0270582 A1* | 10/2013 | Shin | H01L 33/48 |
| | | | 257/88 |
| 2014/0340602 A1 | 11/2014 | Kitajima et al. | |
| 2015/0362807 A1 | 12/2015 | Kitajima et al. | |
| 2016/0320682 A1 | 11/2016 | Kitajima et al. | |

FOREIGN PATENT DOCUMENTS

| | | |
|---|---|---|
| JP | 2012-220792 | 11/2012 |
| WO | 2007/132574 | 11/2007 |

* cited by examiner

DISPLAY PANEL

CROSS-REFERENCE TO RELATED APPLICATION

This application is a bypass continuation of international patent application PCT/JP2016/001071, filed Feb. 26, 2016 designating the United States of America. Priority is claimed based on a Japanese patent application JP2015-103131, filed May 20, 2015. The entire disclosures of these international and Japanese patent applications are incorporated herein by reference in their entirety.

TECHNICAL FIELD

The present disclosure relates to a display panel, especially a display panel having a variant external shape.

BACKGROUND

Conventionally, there has been proposed a method for bonding a pair of substrates constituting a display panel such as a liquid crystal panel by irradiating a seal made of a photosetting resin material with light. For example, a prior art (for example, see, Japanese Unexamined Patent Application Publication No. 2008-107488) discloses a configuration, in which the seal is cured by irradiating the seal with the light through a slit provided in a black matrix formed in a non-display region.

On the other hand, recently, the display panel such as the liquid crystal panel is used in various applications such as a panel (instrument panel) on which meters of a vehicle are displayed. A display panel (or a display region) having a variant external shape different from a rectangular shape is proposed with diversification of the applications. Examples of the display panel having the variant external shape include a display panel having at least one arc corner in four corners and a display panel having a trapezoidal shape, an elliptical shape, a circular shape, or a polygonal shape as a whole.

In a case where the display panel is placed in a high-temperature, high-humidity atmosphere, there is a risk that moisture in the atmosphere infiltrates a liquid crystal layer beyond the seal. When the infiltrated moisture reaches a display region, the moisture causes a stain (blur), and display quality is degraded. At this point, in the display panel in which the photosetting seal is used, because the slit (opening) is required to pass the light during the curing of the seal, the slit constitutes a moisture infiltration route, and there is a risk of degrading the display quality. Particularly, in the display panel having the variant external shape, because a variant portion has a complicated shape, the moisture easily infiltrates the display panel.

The present disclosure has been made in view of the above problems and an object thereof is to provide a display panel that can prevent the moisture from infiltrating the display panel from the outside in the display panel having the variant external shape.

SUMMARY

In one general aspect, the instant application describes a display panel having a variant external shape. The display panel includes a first substrate, a second substrate disposed opposite to the first substrate, liquid crystal sealed between the first substrate and the second substrate, a seal made of a photosetting material, the seal being provided outside a display region, the seal being used to seal the liquid crystal by bonding the first substrate and the second substrate together, and a metallic pattern provided in the first substrate or the second substrate, including a plurality of slits through which light with which the seal is irradiated passes. The plurality of slits are formed along the external shape of the display panel in at least a portion corresponding to a variant portion of the display panel.

The above general aspect may include one or more of the following features.

The plurality of slits may be formed so as to extend in a direction identical to a direction in which a side constituting the external shape of the display panel extends.

The variant portion of the display panel and the plurality of slits may be formed into an arc shape. The plurality of slits may be formed such that a central position of a circle in the variant portion of the display panel is substantially matched with a central position of a circle in each of the plurality of slits.

The metallic pattern may be provided on the first substrate, and irradiated with the light from a rear surface side of the first substrate.

The first substrate may include a plurality of data lines, a plurality of gate lines, and a plurality of pixel electrodes, and the second substrate includes a black matrix.

A common voltage may be supplied to the metallic pattern.

In the display panel of the present disclosure, the moisture can be prevented from infiltrating the display panel from the outside in the display panel having the variant external shape.

DETAILED DESCRIPTION

An embodiment of the present application is described below with reference to the drawings.

Figure 1:
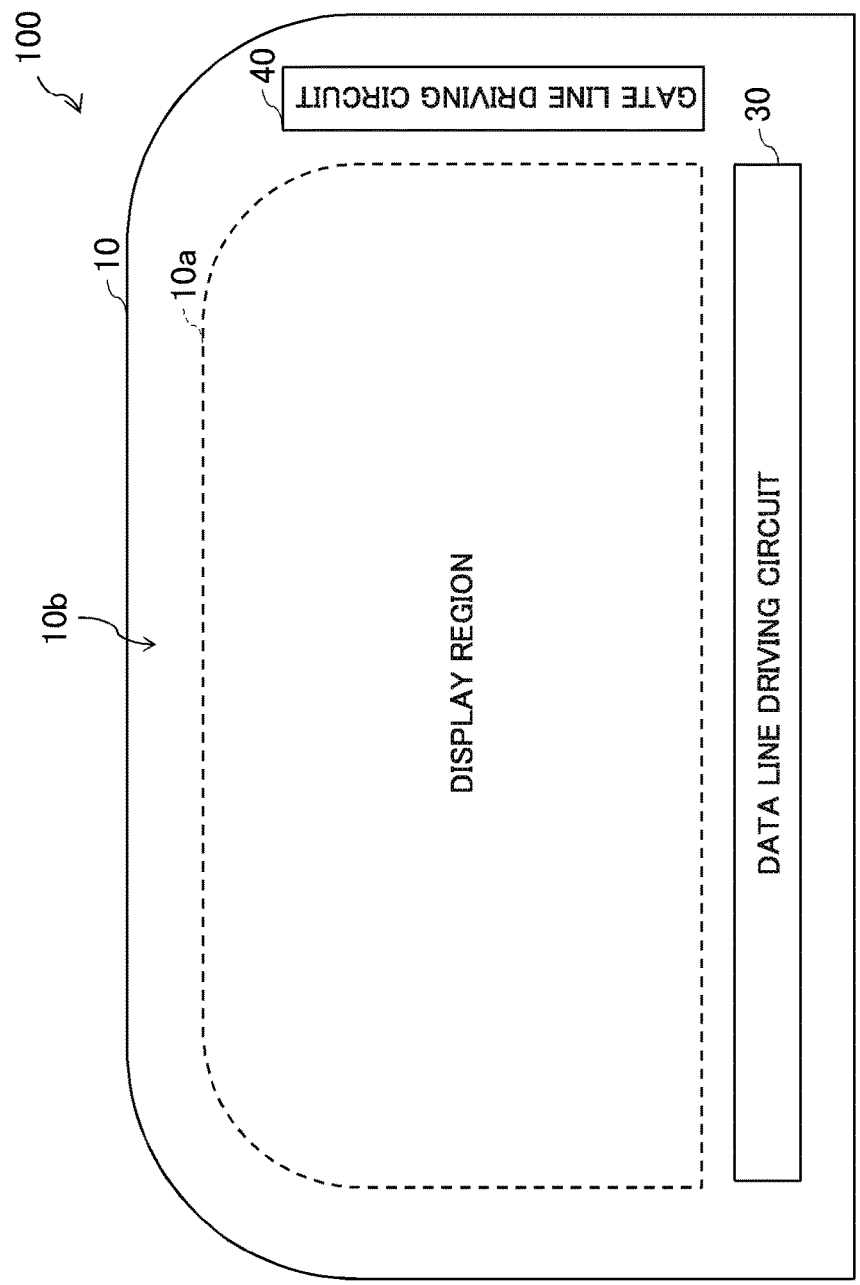
FIG. 1 is a plan view illustrating a schematic configuration of a liquid crystal display device of the exemplary embodiment.

FIG. 1 is a plan view illustrating a schematic configuration of a liquid crystal display device of the exemplary embodiment. Liquid crystal display device 100 includes display panel 10, data line driving circuit 30, gate line driving circuit 40, and a backlight device (not illustrated). Data line driving circuit 30 may be configured with a plurality of source driver ICs, and provided outside display panel 10. Gate line driving circuit 40 may be configured with a plurality of gate driver ICs, and provided outside display panel 10. Although not illustrated, a timing controller that controls operation of data line driving circuit 30 and gate line driving circuit 40 may be provided in or outside display panel 10.

In an external shape of display panel 10, two upper corners in four corners are formed into an arc shape. The external shape of display panel 10 is not limited to the shape in FIG. 1. For example, the external shape of display panel 10 may be formed into a trapezoidal shape, an elliptical shape, a circular shape, or a polygonal shape. That is, the external shape of display panel 10 is formed into a variant shape. When classified into regions, display panel 10 is configured with display region 10a where an image is displayed and frame region 10b around display region 10a. Display region 10a is formed into the variant shape corresponding to the external shape of display panel 10. Display region 10a may be formed into a rectangular shape.

Figure 2:
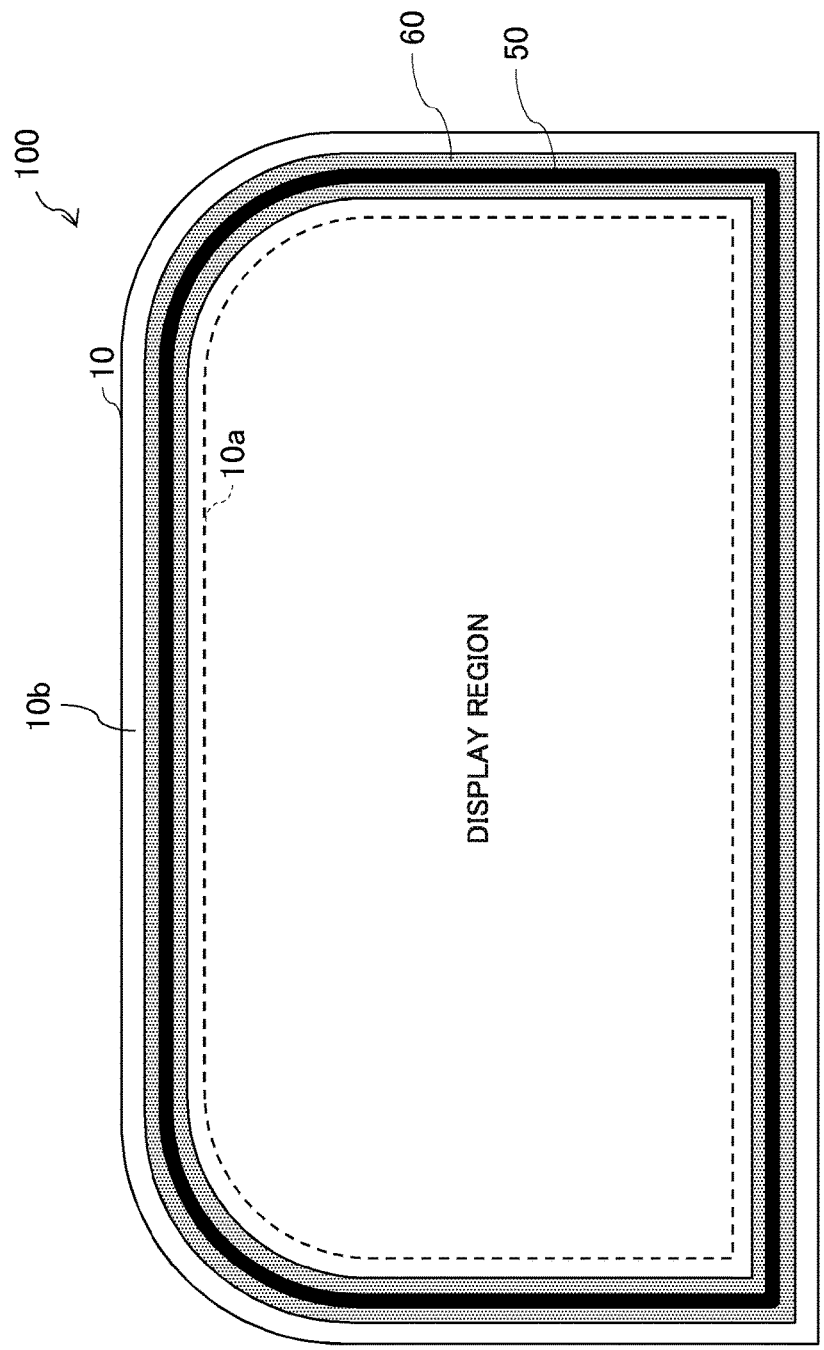
FIG. 2 is a plan view illustrating a schematic configuration of frame region of display panel of the exemplary embodiment.

FIG. 2 is a plan view illustrating a schematic configuration of frame region 10b of display panel 10. Seal 50 for bonding a thin film transistor substrate (TFT substrate) and a color filter substrate (CF substrate) together, the TFT substrate and the CF substrate constituting display panel 10, and light blocking metallic pattern 60 preventing light leakage from frame region 10b are formed in frame region 10b. Seal 50 and metallic pattern 60 are formed into a frame shape so as to surround a periphery of display region 10a. Seal 50 is disposed so as to overlap with metallic pattern 60 in planar view. Seal 50 is made of a photosetting resin material, and is cured by irradiating seal 50 with light (for example, ultraviolet ray). Seal 50 is cured to bond the TFT substrate and the CF substrate together, thereby sealing liquid crystal injected between the TFT substrate and the CF substrate. A specific configuration of metallic pattern 60 will be described later.

Figure 3:
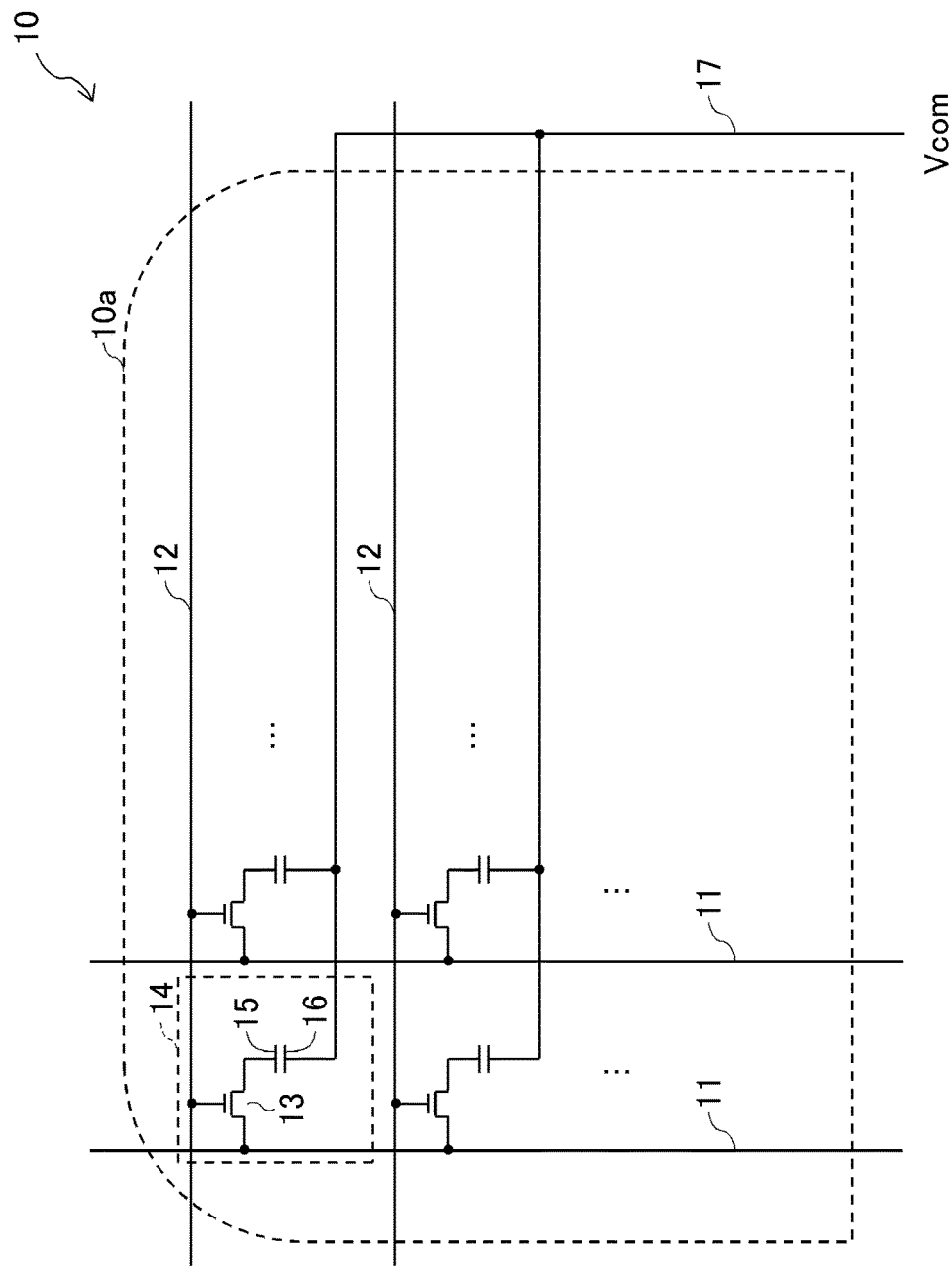
FIG. 3 is an equivalent circuit diagram illustrating a schematic configuration of display panel of the exemplary embodiment.

FIG. 3 is an equivalent circuit diagram illustrating a schematic configuration of display panel 10. A plurality of data lines 11 extending in a column direction and a plurality of gate lines 12 extending in a row direction are provided in display panel 10. Thin film transistor 13 (TFT) is provided in an intersection of each data line 11 and each gate line 12. Each data line 11 is connected to data line driving circuit 30. Each gate line 12 is connected to gate line driving circuit 40.

In display panel 10, a plurality of pixels 14 are arrayed into a matrix shape (the row direction and the column direction) corresponding to the intersections of data lines 11 and gate lines 12. Although not illustrated, display panel 10 includes the TFT substrate, the CF substrate, and a liquid crystal layer sandwiched between the TFT substrate and the CF substrate. In the TFT substrate, a plurality of pixel electrodes 15 are provided corresponding to pixels 14. Common electrode 16 common to pixels 14 is provided in the CF substrate. Common electrode 16 may be provided in the TFT substrate.

A data signal (data voltage) is supplied from data line driving circuit 30 to each data line 11. A gate signal (gate-on voltage, gate-off voltage) is supplied from gate line driving circuit 40 to each gate line 12. Common voltage Vcom is supplied from a common electrode driving circuit (not illustrated) to common electrode 16 through common wiring 17. When the gate-on voltage is supplied to gate line 12, thin film transistor 13 connected to gate line 12 is turned on, and the data voltage is supplied to pixel electrode 15 through data line 11 connected to thin film transistor 13. An electric field is generated by a difference between the data voltage supplied to pixel electrode 15 and common voltage Vcom supplied to common electrode 16. The liquid crystal is driven by the electric field, and transmittance of light emitted from a backlight is controlled, thereby displaying an image. For performing color display, a desired data voltage is supplied to data line 11 connected to pixel electrode 15 of pixel 14 corresponding to each of red, green, and blue, which are formed by a stripe color filter.

Display panel 10 of the exemplary embodiment has a configuration for preventing the moisture generated in the atmosphere from infiltrating display panel 10. The detailed configuration will be described below.

Figure 4:
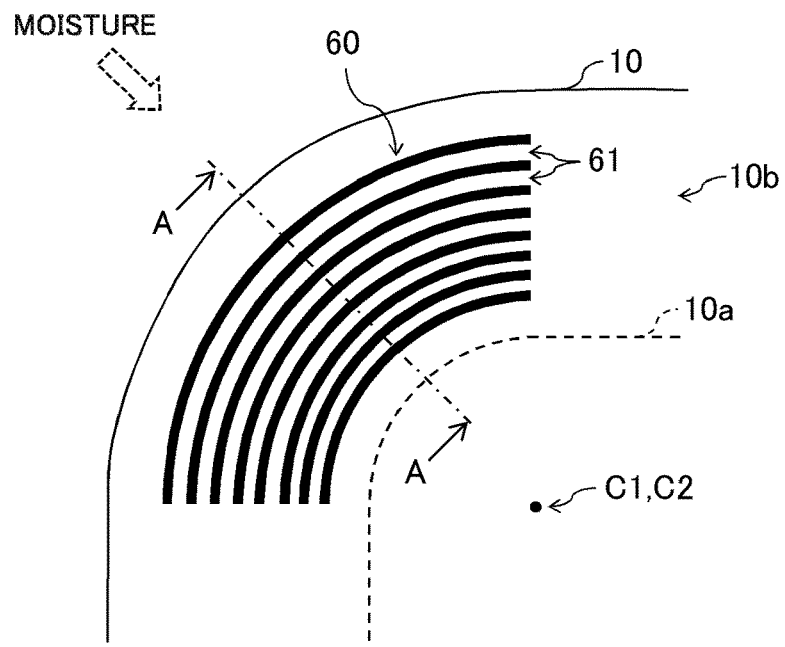
FIG. 4 is a plan view illustrating a configuration of metallic pattern of display panel of the exemplary embodiment.

FIG. 4 is a plan view illustrating a configuration of metallic pattern 60. In FIG. 4, an arc corner (an upper left portion in a viewing state) of display panel 10 in FIG. 2 is enlarged, and seal 50 is omitted. As illustrated in FIG. 4, metallic pattern 60 includes a plurality of slits 61 (openings). Each slit 61 is formed along the external shape of display panel 10. That is, each slit 61 is formed so as to extend in a direction identical to a direction in which a side constituting the external shape of display panel 10 extends. For example, as illustrated in FIG. 4, in a case where the external shape is an arc shape, each slit 61 is formed such that center C1 of a circle of slit 61 is substantially matched with center C2 of a circle of the external shape (variant portion) of display panel 10. Slit 61 is an opening through which light with which seal 50 is irradiated passes. There is no limitation to a size and a number of slits 61.

Figure 5:
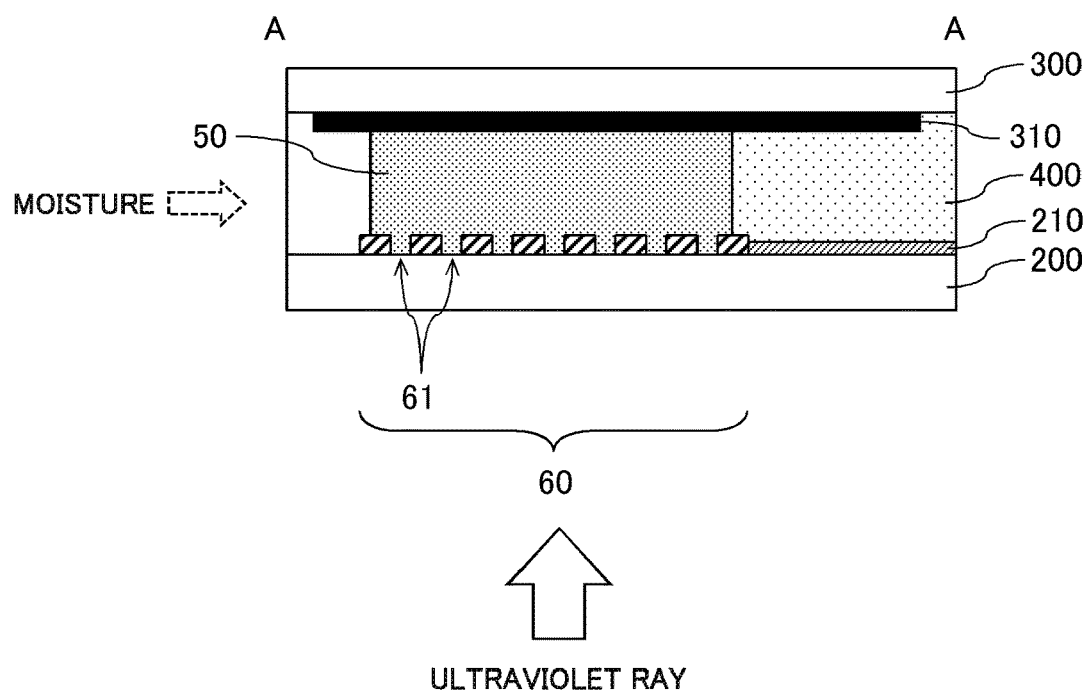
FIG. 5 is a sectional view taken along line A-A in FIG. 4.

FIG. 5 is a sectional view taken along line A-A in FIG. 4. Display panel 10 includes TFT substrate 200, CF substrate 300, and liquid crystal layer 400 sandwiched between TFT substrate 200 and CF substrate 300. Metallic pattern 60 is formed on TFT substrate 200 by patterning. Preferably metallic pattern 60 is formed at the same time as a gate electrode, a drain electrode, a source electrode, or a common wiring are formed in TFT substrate 200. Metallic pattern 60 is made of aluminum, molybdenum, chromium, or an alloy thereof. Seal 50 is disposed so as to overlap with metallic pattern 60 in planar view. Seal 50 is irradiated with the ultraviolet ray from the outside (a rear surface side in FIG. 5) while the ultraviolet ray passes through each slit 61 of metallic pattern 60. Therefore, seal 50 is cured to bond the TFT substrate and the CF substrate together, and the liquid crystal of liquid crystal layer 400 is sealed. A known production process can be adopted in the process of bonding the TFT substrate and the CF substrate by irradiating seal 50 with the ultraviolet ray. Alignment film 210 is formed on a side of liquid crystal layer 400 of TFT substrate 200. Alignment film 210 is formed inside metallic pattern 60, and metallic pattern 60 acts as a dam for an alignment film solution.

Figure 6:
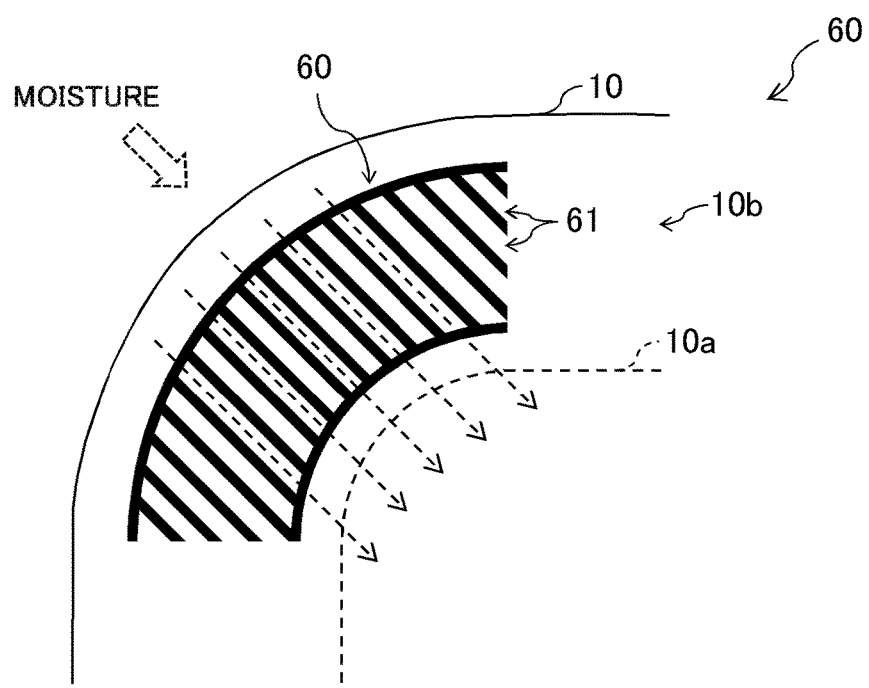
FIG. 6 is a plan view illustrating a configuration of metallic pattern of display panel of a comparative example.

FIG. 6 is a plan view illustrating a comparative example of metallic pattern 60 in FIG. 4. Because slit 61 extends toward the outside of display panel 10 in the comparative example of FIG. 6, slit 61 constitutes the infiltration route of the moisture from the outside, and the moisture easily infiltrates display region 10a. On the other hand, in the configuration of metallic pattern 60 of the exemplary embodiment in FIG. 4, because each slit 61 is formed along the external shape of display panel 10, the moisture can be prevented more effectively from infiltrating display panel 10 from the outside compared with the comparative example.

Figure 7:
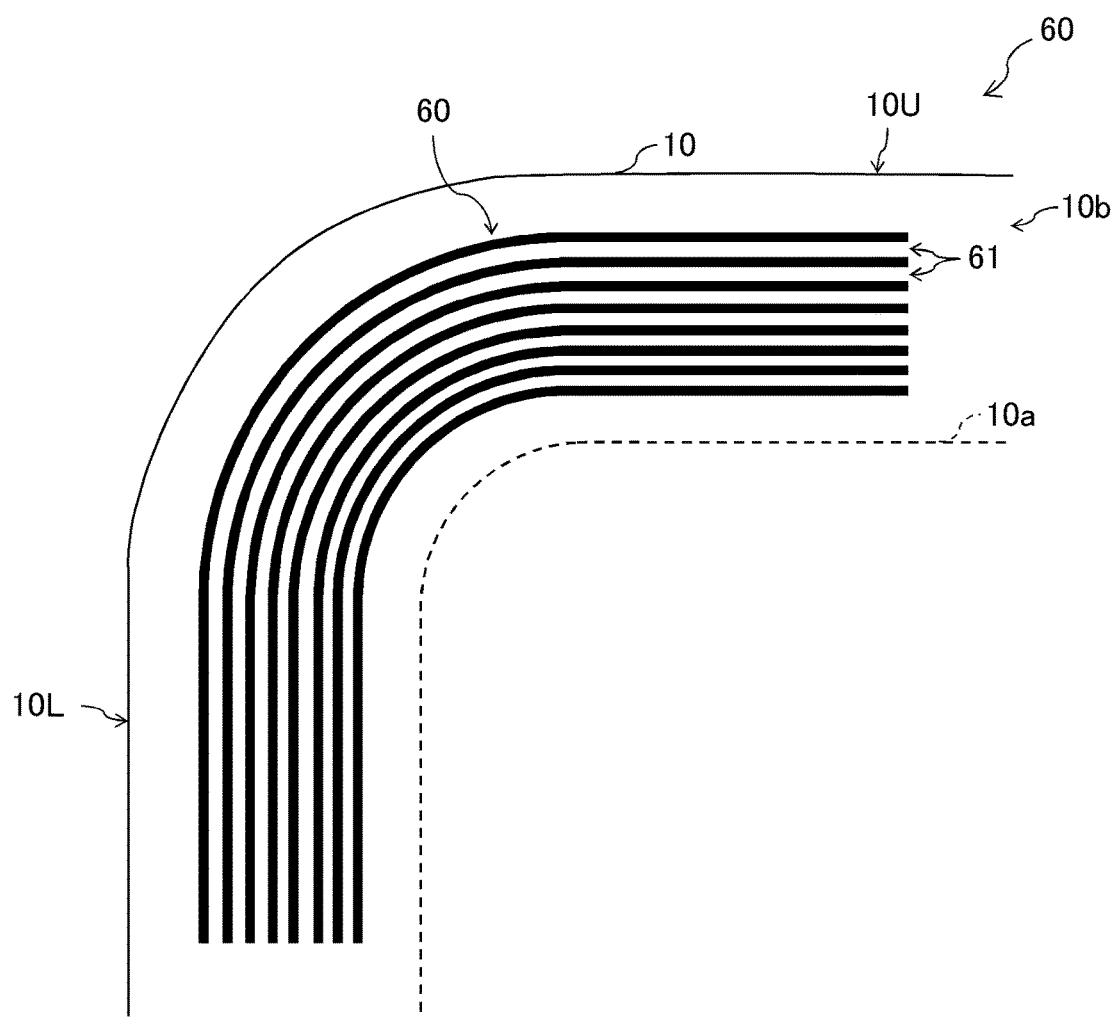
FIG. 7 is a plan view illustrating another configuration of metallic pattern of display panel of the exemplary embodiment.

Preferably each slit 61 of metallic pattern 60 is formed along the external shape of display panel 10 in portions except for the arc corner. FIG. 7 illustrates slit 61 corresponding to a linear side (an upper side and a left side) constituting the external shape of display panel 10. Specifically, in the portion corresponding to left side 10L of display panel 10, slit 61 is formed so as to extend linearly in a direction identical to a direction (a vertical direction in FIG. 7) in which left side 10L extends. In the portion corresponding to upper side 10U of display panel 10, slit 61 is formed so as to extend linearly in a direction identical to a direction (a horizontal direction in FIG. 7) in which upper side 10U extends.

Figure 8:
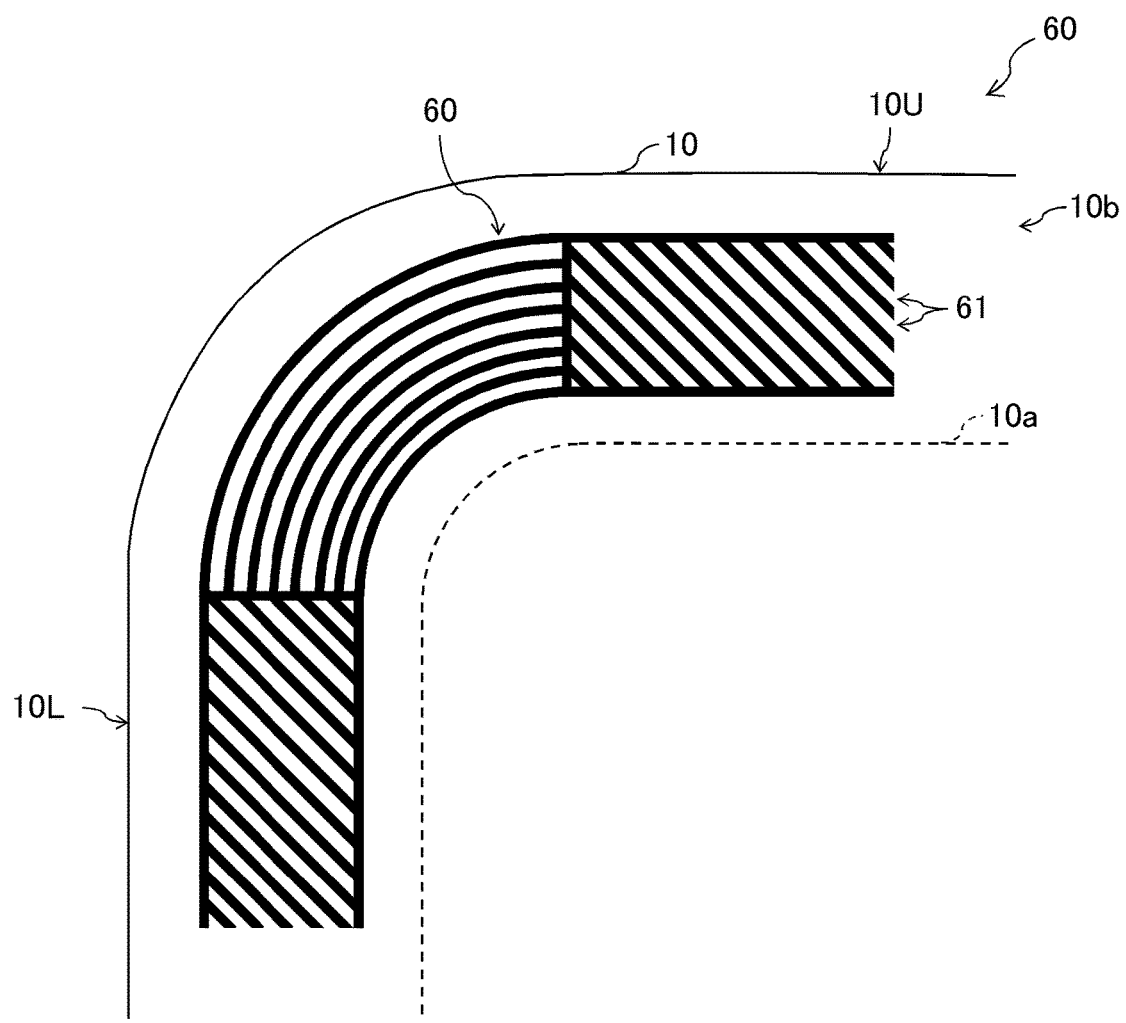
FIG. 8 is a plan view illustrating another configuration of metallic pattern of display panel of the exemplary embodiment.

In the portion except for the arc corner, slit 61 of metallic pattern 60 may be formed in an oblique direction with respect to the external shape of display panel 10. FIG. 8 illustrates slit 61 in the portion corresponding to a linear side (the upper side and the left side) of display panel 10. Specifically, in the portion corresponding to left side 10L of display panel 10, slit 61 is formed so as to extend linearly in the oblique direction with respect to the direction (the vertical direction in FIG. 8) in which left side 10L extends. Similarly, in the portion corresponding to upper side 10U of display panel 10, slit 61 is formed so as to extend linearly in the oblique direction with respect to the direction (the horizontal direction in FIG. 8) in which upper side 10U extends.

Figure 9:
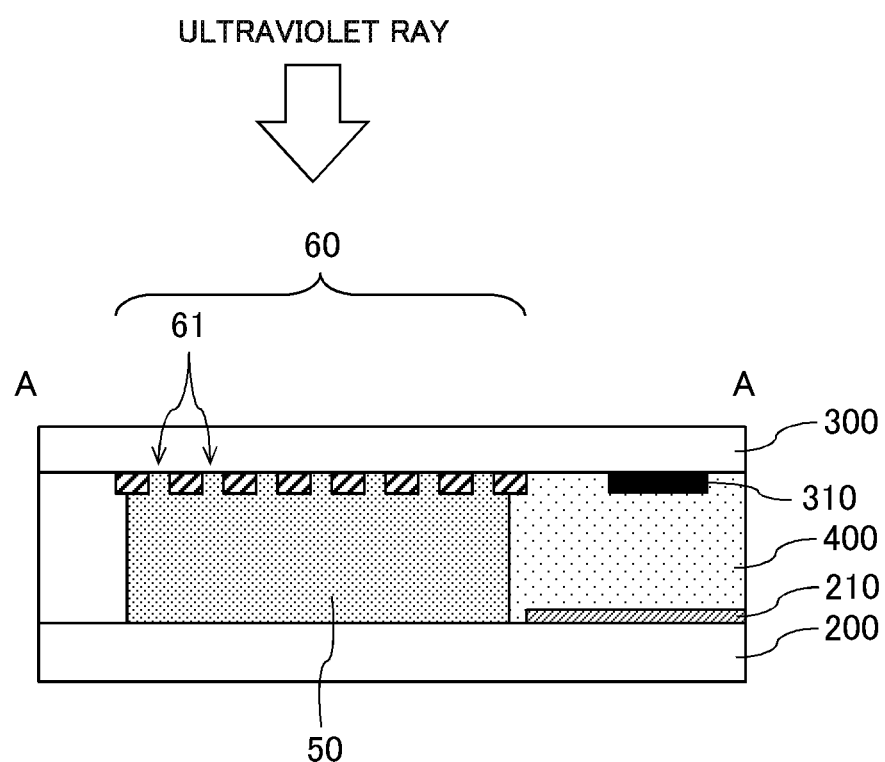
FIG. 9 is a cross section view illustrating another configuration of display panel of the exemplary embodiment.

In the above configuration, metallic pattern 60 is provided in TFT substrate 200. However, as illustrated in FIG. 9, metallic pattern 60 may be provided in CF substrate 300. In the configuration of FIG. 9, metallic pattern 60 is irradiated with the ultraviolet ray from the side of CF substrate 300. In the configuration of FIG. 9, metallic pattern 60 may be made of the same material as black matrix 310.

Figure 10:
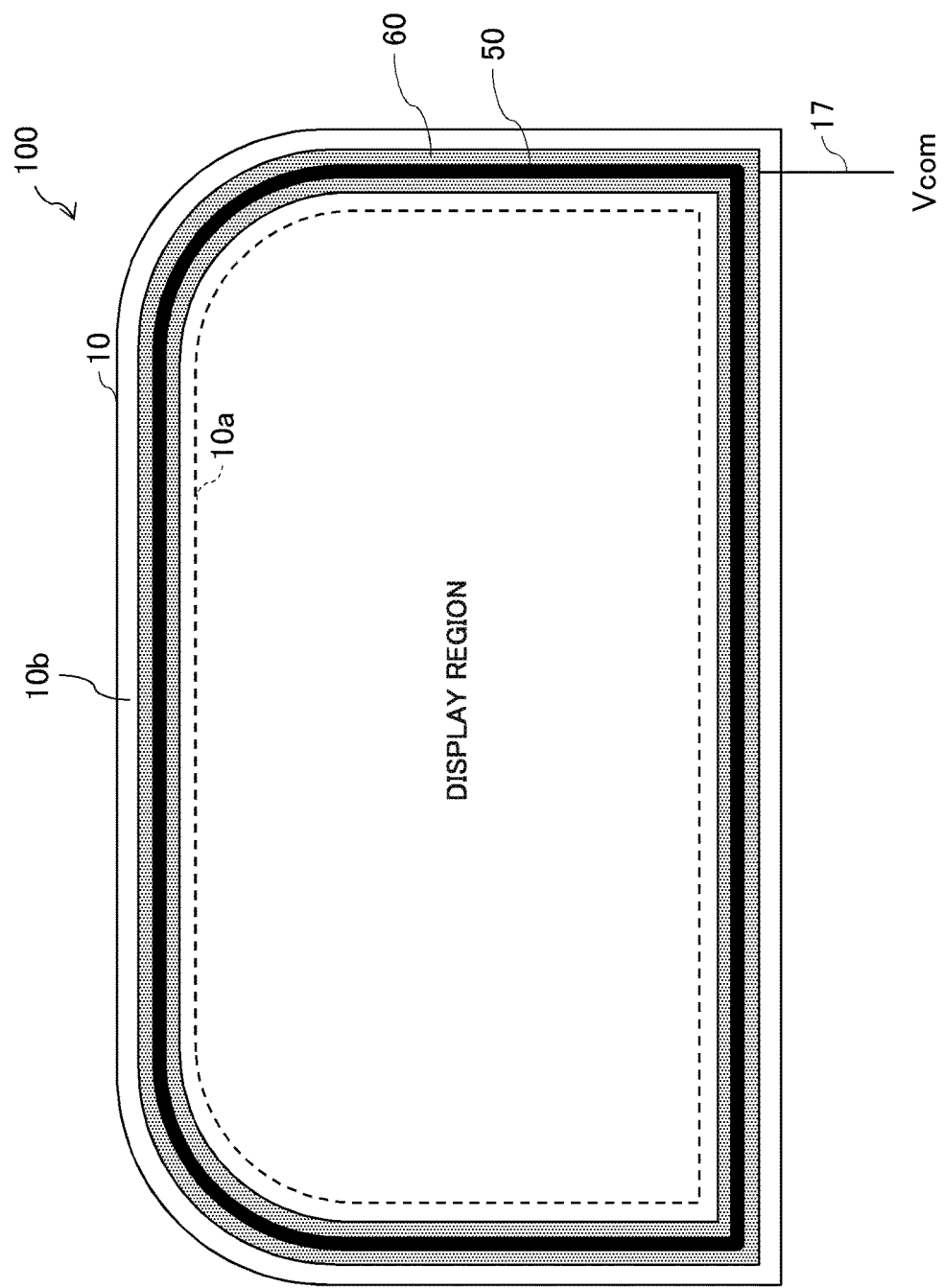
FIG. 10 is a plan view illustrating another configuration of display panel of the exemplary embodiment.

FIG. 10 is a plan view illustrating another configuration of display panel 10. In display panel 10 of FIG. 10, common wiring 17 is electrically connected to metallic pattern 60, and common voltage Vcom is supplied from the common electrode driving circuit to metallic pattern 60 through common wiring 17. Therefore, metallic pattern 60 can be fixed to common voltage Vcom, and avoid being in the floating state.

While there have been described what are at present considered to be certain embodiments of the application, it will be understood that various modifications may be made thereto, and it is intended that the appended claims cover all such modifications as fall within the true spirit and scope of the invention.

What is claimed is:

1. A display panel having a variant external shape, the display panel comprising:
    a first substrate;
    a second substrate disposed opposite to the first substrate;
    liquid crystal sealed between the first substrate and the second substrate;
    a seal made of a photosetting material, the seal being provided outside a display region, the seal being used to seal the liquid crystal by bonding the first substrate and the second substrate together; and
    a metallic pattern provided on the first substrate or the second substrate, the metallic pattern including a plurality of slits through which light with which the seal is irradiated passes,
    wherein the display panel has a variant portion, a first non-variant portion, and a second non-variant portion disposed in an outer region of the display panel, the variant portion being disposed between the first non-variant portion and the second non-variant portion along an external shape of the display panel,
    the metallic pattern includes a first metallic pattern in the variant portion, a second metallic pattern in the first non-variant portion, and a third metallic pattern in the second non-variant portion, the first metallic pattern being formed along the external shape of the variant portion of the display panel from a first boundary between the variant portion and the first non-variant portion to a second boundary between the variant portion and the second non-variant portion,
    the plurality of slits including first slits in the variant portion, second slits in the first non-variant portion, and third slits in the second non-variant portion, the first slits being formed in the first metallic pattern along the external shape of the variant portion of the display panel from the first boundary to the second boundary, and
    the metallic pattern overlaps with the seal at the variant portion of the display panel in plan view.

2. The display panel according to claim 1,
    wherein the variant portion of the display panel and the first slits in the first metallic pattern are formed into an arc shape, and
    the first slits are formed such that a central position of a circle in the variant portion of the display panel is substantially matched with a central position of a circle in each of the first slits.

3. The display panel according to claim 1, wherein the metallic pattern is provided on the first substrate, and irradiated with the light from a rear surface side of the first substrate.

4. The display panel according to claim 3, wherein the first substrate includes a plurality of data lines, a plurality of gate lines, and a plurality of pixel electrodes, and the second substrate includes a black matrix.

5. The display panel according to claim 1, wherein a common voltage is supplied to the metallic pattern.

6. The display panel according to claim 1, wherein a part of the metallic pattern is exposed from the seal at the portion corresponding to the variant portion of the display panel.

7. The display panel according to claim 6, wherein the part of metallic pattern contacts an alignment film.

8. The display panel according to claim 1, wherein the metallic pattern is different from a data line.

9. The display panel according to claim 1, wherein the metallic pattern is different from a gate line.

* * * * *